E. P. BULLARD, Jr.
MACHINE TABLE SPINDLE BEARING.
APPLICATION FILED MAR. 12, 1910.
1,047,162.
Patented Dec. 17, 1912.
2 SHEETS—SHEET 2.
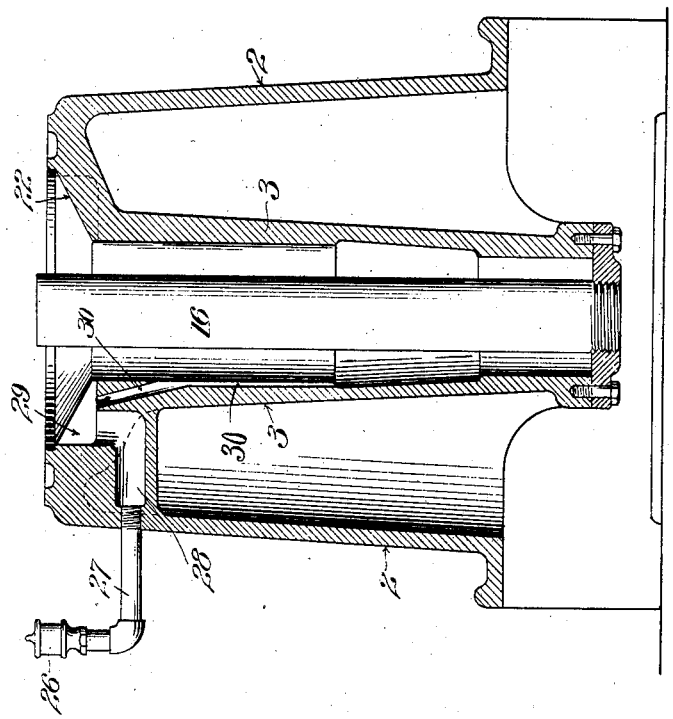
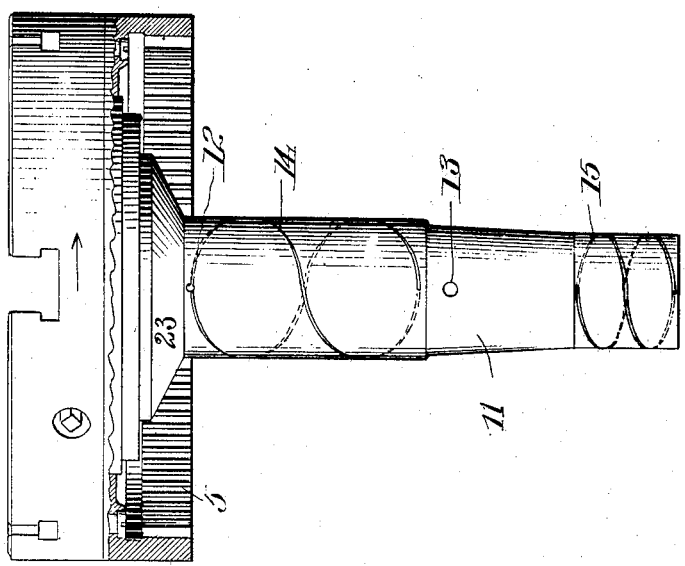
Witnesses
Ernst P. Wold
Ruth Raymond
Inventor
Edward P. Bullard Jr.
By Chamberlain & Newman
Attorneys

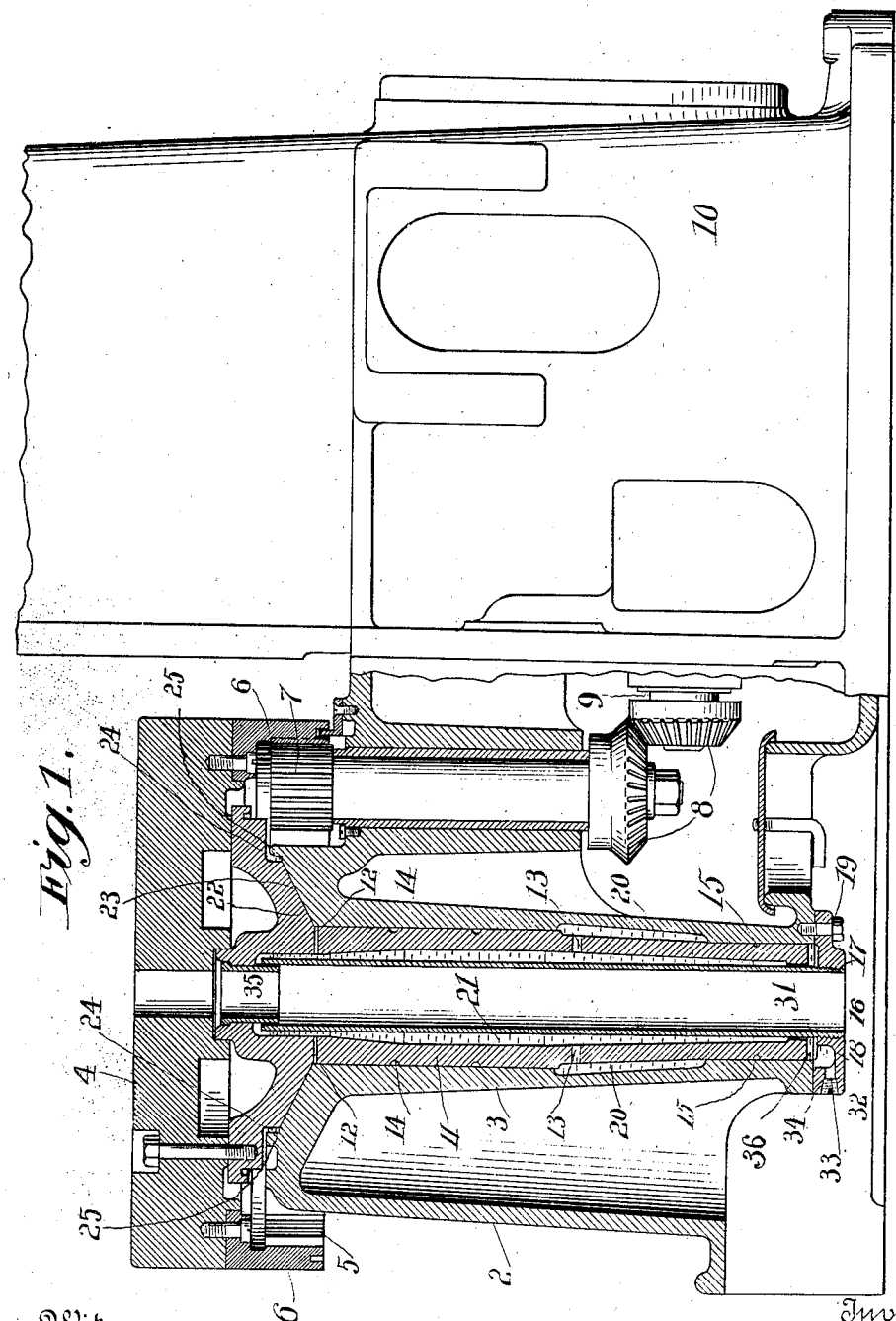

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

MACHINE-TABLE-SPINDLE BEARING.

1,047,162.  Specification of Letters Patent.  Patented Dec. 17, 1912.

Application filed March 12, 1910. Serial No. 548,809.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Machine-Table-Spindle Bearings, of which the following is a specification.

This invention refers to machine tools and relates particularly to an improved form of bearing and spindle as employed in vertical turret lathes and other forms of machines, and it is the object to improve upon the construction for oiling the said bearing, whereby the same may be operated in a circulating body of oil, thereby insuring a proper distribution, and oiling of all operative parts.

Similar characters of reference will be found to designate like or corresponding parts throughout the several figures of the accompanying drawing and of which, Figure 1, shows a central vertical longitudinal section through a machine tool spindle constructed in accordance with my invention. Fig. 2, shows a detached side elevation of the rotatable table and spindle shown in Fig. 1, and Fig. 3, shows a vertical section of the table spindle bearing shown in Fig. 1, taken at a right angle from that of Fig. 1.

Referring to the drawings, numerals 2 and 3 represent respectively the outer and inner annular walls of the base frame 1 which support the lathe table.

4 represents a rotatable table having a rack 5 formed on the inner face of the depanding annular flange 6. With this rack a pinion 7 meshes, which in turn is driven through suitable gears 8 from a horizontal shaft 9 connected to the motor 10.

The annular wall 3 of the base frame forms a central well adapted to receive the hollow rotatable spindle 11 of the table 4. This spindle has radial holes 12 and 13 and peripheral right hand spiral grooves 14 and 15, for a purpose hereinafter described.

Within the hollow spindle 11 is a tubular pipe 16 externally screw threaded at its lower end at 17 upon which the plate 18 screws and is secured thereto and to the base frame by bolts 19. This plate 18 has an opening 32 communicating with pocket 31 normally closed by plug 33 and packing 34.

Depending centrally from the under face of the table 4 is a short sleeve 35 of a diameter slightly less than the pipe 16, into the upper end of which it extends a short distance. The adjacent faces of the wall 3 and spindle 11 have coinciding annular recesses which when the parts are assembled as seen in Fig. 1, form an oil pocket 20, while the inner face of the spindle is recessed to form the oil chamber 21 which extends the entire length between itself and the tubular member 16. The upper end of the frame has formed thereon an inclined bearing surface 22 adapted to receive the annular inclined bearing surface 23, upon the underside of the table. These inclined bearing surfaces are below the surface line of the oil within the pocket 24 formed by wall 25 thus insuring the lubrication of their entire contacting surfaces.

26 represents a filling cup or reservoir connected through pipe 27 with an oil pocket 28, located in the upper portion of the frame and through which the oil is fed to the bearings 23 for lubricating the same. The initial filling of the bearings with oil is obviously through the before mentioned cup and pipe, and radial oil chambers 29 formed in the bearing surface 22. An inclined passageway 30 extending through the wall 3 further serves to direct the oil from the chamber 29 at the top to the before mentioned pockets 20 and 31. When filled these pockets overflow into the chamber 21 which is also quickly filled to the point indicated in Fig. 1, that being the level of the oil in reservoirs and annular pocket 24.

After the bearings are filled as above and the table started to rotate, the oil throughout the bearing is caused to circulate in the following manner and by reason of the spiral grooves 14 and 15 in the spindle which is driven in the direction of the arrow, see Fig. 2. These grooves obviously serve to draw the oil through the holes 12 from the inner chamber 21 and force it down around the outer surface of the spindle. The oil is thus worked into the pockets 20 and 31 and through the holes 13 and openings 36 back into the inner chamber 21 when it rises to again be passed through the holes and down upon the outside and back upon the inside.

It will readily be seen from the foregoing that the entire bearings of the table are submerged and that a continuous circulation of the oil in which the spindle operates is effected, by the action of said spindle and the spiral grooves 14 and 15 thereof which have a tendency to draw the oil from all the pockets, chambers and portions of the bearing, in a manner to thoroughly lubricate all the operative parts.

What I claim as my invention is:—

1. In a self lubricating table and spindle bearing for machine tools, the combination of a base frame having a central opening therethrough, a cap attached over the lower end of the opening, a centrally disposed pipe attached to the cap and projected through the said central opening, a spindle mounted in said opening and surrounding the pipe and having a cut away portion on both its inner and outer sides and holes therethrough to form communicating oil pockets between said spindle and pipe, and a sleeve attached to the table and extending down into the said pipe.

2. A self lubricating table and spindle bearing for machine tools, comprising a base frame having an oil pocket therein and a downwardly inclined oil passage extending through the wall thereof and also having an inclined bearing on said base with a radial slot therethrough communicating with said oil pocket and said inclined passage, and a removable hollow spindle that extends down into the base frame and having an inclined portion to rotate upon the bearing of the frame and having oil passages therethrough, a tubular member for inclosing the lower end of the spindle and extending up therein to form an annular oil pocket against the inside of the spindle, and a sleeve extending from the table into the said tube.

3. In a self lubricating table and spindle bearing for machine tools, the combination with a base frame provided with an inclined bearing and a central spindle hole, a cap attached over the lower end of the hole, a hollow spindle within said hole and having an inclined bearing to fit that of the frame and provided with peripheral spiral grooves that are inclosed by the side walls of the hole and having radial openings passing through the said spindle, a tubular member secured to the said cap and extended up within said spindle and separated therefrom to form an oil chamber between it and the inside of the spindle.

4. A self lubricating table and spindle for machine tools, comprising a base frame having a spindle socket therein, a hollow spindle fitting in said socket having right and left hand peripheral spiral grooves respectively adjacent the upper and lower ends thereof and inclosed by the walls of the socket to cause the lubricant to circulate, a pipe within said spindle spaced therefrom to form an oil chamber, the adjacent contacting surfaces of said spindle and base frame being recessed to form an oil pocket and said spindle having radial openings connecting said oil pocket and chamber, and a plate adapted to secure said pipe to the base frame.

Signed at Bridgeport, in the county of Fairfield, and State of Connecticut, this 18th day of February A. D., 1909.

EDWARD P. BULLARD, Jr.

Witnesses:
W. J. LYNCH,
D. B. YOUNG.